United States Patent [19]
Laakso et al.

[11] Patent Number: 5,930,289
[45] Date of Patent: Jul. 27, 1999

[54] CDMA RECEPTION METHOD AND A CDMA RECEIVER WHICH CALCULATES AN ESTIMATE FROM SAMPLES FOR EACH DESIRED SIGNAL DURING A MONITORING PERIOD

[75] Inventors: Timo Laakso, Espoo; Jorma Lilleberg, Oulu, both of Finland

[73] Assignee: Nokia Telecommunications Oy, Espoo, Finland

[21] Appl. No.: 08/809,532

[22] PCT Filed: Sep. 11, 1995

[86] PCT No.: PCT/FI95/00492

§ 371 Date: Mar. 12, 1997

§ 102(e) Date: Mar. 12, 1997

[87] PCT Pub. No.: WO96/08881

PCT Pub. Date: Mar. 21, 1996

[30] Foreign Application Priority Data

Sep. 12, 1994 [FI] Finland ..................................... 944202

[51] Int. Cl.⁶ ................................................. H04B 15/00
[52] U.S. Cl. .......................... 375/200; 375/340; 375/346; 370/342; 371/43.1
[58] Field of Search .................................... 375/200, 206, 375/229–232, 316, 340, 341, 346, 348–350; 370/203, 208, 209, 320, 335, 342, 441, 479; 371/43.6, 43.7, 43.8; 364/724.011, 724.19, 724.2; 455/130, 149, 296, 303, 305, 306, 307, 334, 337

[56] References Cited

U.S. PATENT DOCUMENTS

| | | | |
|---|---|---|---|
| 5,099,499 | 3/1992 | Hammar | 375/341 |
| 5,231,648 | 7/1993 | Driedger et al. | 375/231 |
| 5,323,422 | 6/1994 | Ushirokawa | 375/232 |
| 5,331,666 | 7/1994 | Dent | 375/341 |
| 5,553,062 | 9/1996 | Schilling et al. | 370/479 |
| 5,592,516 | 1/1997 | Guglielmi et al. | 375/347 |
| 5,615,234 | 3/1997 | Brooks | 375/350 |
| 5,715,279 | 2/1998 | Laakso et al. | |

FOREIGN PATENT DOCUMENTS

| | | |
|---|---|---|
| 508407 | 10/1992 | European Pat. Off. |
| 550143 | 7/1993 | European Pat. Off. |
| 604208 | 6/1994 | European Pat. Off. |
| 469052 | 11/1993 | Sweden . |
| 91/07035 | 5/1991 | WIPO . |
| 94/00924 | 1/1994 | WIPO . |
| 96/01544 | 1/1996 | WIPO . |

OTHER PUBLICATIONS

Temes, G.C. and Mitra, S.K., Modern Filter Theory and Design. New York: John Wiley & Sons, pp. 510–511, 1973.

Varanasi, M.K. and Aazhang, B., "Multistage Detection in Asynchronous Code–Division Multiple–Access Communications," IEEE Trans. on Communications, vol. 38, No. 4, pp. 509–519, Apr. 1990.

Duel–Hallen, A., "Decorrelating Decision–Feedback Multiuser Detector for Synchronous Code–Division Multiple–Access Channel," IEEE Trans. on Communications, vol. 41, No. 2, pp. 285–290, Feb. 1993.

(List continued on next page.)

*Primary Examiner*—Amanda Le
*Attorney, Agent, or Firm*—Pillsbury Madison & Sutro LLP

[57] ABSTRACT

The invention relates to a reception method and a receiver comprising means where a received signal is sampled, and means where the mutual delays of the transmissions contained in the signal and the strengths of the transmissions are measured from the received signal, said transmissions originating in one or more transmitters. In order to ensure reception of high quality, the receiver according to the invention comprises means, the input of which, is the sampled signal, and in which an estimate is calculated from the samples for each desired transmission on the basis of all samples which have arrived during a certain monitoring period, and that whenever a new sample arrives at the input of the means, the means updates the calculated estimates on the basis of the new sample.

37 Claims, 2 Drawing Sheets

OTHER PUBLICATIONS

Lupas, Verdu: Linear multiuser detectors for synchronous code–division multiple access channels, IEEE Transactions on Information Theory, vol. 35, No. 1, pp. 123–135, Jan. 1989.

Lupas, Verdu: Near–far resistence of multiuser detectors in asynchronous channels, IEEE Transactions on Communications, vol. 38, Apr. 1990.

S. M. Kay, Fundamentals of Statistical Signal Processing: Estimation Theory, Prentice–Hall, New Jersey, 1993, Section 12.6.

A Method for Estimating A Channel, And A Receiver, U.S. application No. 08/526,462.

R. W. Farebrother, Linear Least—Squares Computations, Marcel Dekker, New York, 1988, Chapter 8. Least Squares, pp. 232–251.

CDMA RECEPTION METHOD AND A CDMA RECEIVER WHICH CALCULATES AN ESTIMATE FROM SAMPLES FOR EACH DESIRED SIGNAL DURING A MONITORING PERIOD

This application is the national phase of international application PCT/FI95/00492, filed Sep. 11, 1995 which designated the U.S.

BACKGROUND OF THE INVENTION

1. Field of the Invention

The invention relates to a reception method wherein a received signal is sampled, and wherein the mutual delays of transmissions contained in the signal and the strengths of the transmissions are measured from the received signal, said transmissions originating in one or more transmitters.

2. Description of the Related Art

A central problem in designing and implementing a data transmission system is simultaneous transmission and reception of signals from several simultaneous users such that the signals interfere with one another as little as possible. Because of this and the transmission capacity used, various transmission protocols and multiple access methods have been used, the most common especially in mobile phone traffic being FDMA (Frequency Division Multiple Access) and TDMA (Time Division Multiple Access), and recently CDMA (Code Division Multiple Access) also.

CDMA is a multiple access method based on a spread spectrum technique, and it has been recently put into use in cellular radio systems in addition to previously used FDMA and TDMA. CDMA has many advantages over the prior methods, such as simplicity of frequency planning, and spectrum efficiency.

In a CDMA method, a narrow-band data signal of a user is multiplied to a relatively broad band by a spreading code having a much broader band than the data signal. Band widths used in known test systems include e.g. 1.25 MHz, 10 MHz and 25 MHz. The multiplication spreads the data signal over the entire band to be used. All the users transmit simultaneously on the same frequency band. A different spreading code is used on each connection between a base station and a mobile station, and the signals of the users can be distinguished from one another in the receivers on the basis of the spreading code of the user. If possible, the spreading codes are selected in such a way that they are mutually orthogonal, i.e. they do not correlate with one another.

Correlators in conventionally implemented CDMA receivers are synchronized with a desired signal, which they recognize on the basis of the spreading code. In the receiver the data signal is restored to the original band by multiplying it by the same spreading code as in the transmission step. Ideally, the signals that have been multiplied by some other spreading code do not correlate and are not restored to the narrow band. In view of the desired signal, they thus appear as noise. The object is to detect the signal of the desired user from among a number of interfering signals. In practice, the spreading codes correlate, and the signals of the other users make it more difficult to detect the desired signal by distorting the received signal. This interference caused by the users to one another is called multiple access interference.

The situation is especially problematic when one or several users transmit with a considerably greater signal strength than the other users. These users employing greater signal strength interfere considerably with the connections of the other users. Such a situation is called a near-far problem, and it may occur for example in cellular radio systems when one or several users are situated near the base station and some users further away, whereupon the users that are situated closer blanket the signals of the other users in the base station receiver, unless the power control algorithms of the system are very fast and efficient.

The reliable reception of signals is problematic especially in asynchronous systems, i.e. systems where the signals of the users are not synchronized with one another, since the symbols of the users are disturbed by the several symbols of the other users. In conventional receivers, filters matched with the spreading codes, and sliding correlators, which are both used as detectors, do not function well in near-far situations, however. Of the known methods the best result is provided by a decorrelating detector, which eliminates multiple access interference from the received signal by multiplying it by the cross-correlation matrix of the spreading codes used. The decorrelating detector is described in greater detail in Lupas, Verdu, 'Linear multiuser detectors for synchronous code-division multiple access channels', *IEEE Transactions on Information Theory*, Vol. 35, No. 1, pp. 123–136, Jan 1989; and Lupas, Verdu, 'Near-far resistance of multiuser detectors in asynchronous channels', *IEEE Transactions on Communications*, Vol. 38, Apr 1990, which are referred to here. These methods, however, also involve many operations, such as matrix inversion operations, that require a high calculating capacity and that are especially demanding when the quality of the transmission channel and the number of the users vary constantly, as for example in cellular radio systems.

SUMMARY OF THE INVENTION

The purpose of the present invention is to provide a reception method which works well both in asynchronous and synchronous systems and also when there are strong noise signals in the received signal, for example in near-far situations. The purpose is also to provide a reception method resulting in lower bit-error ratios than the conventional methods and which comprises no demanding calculation operations in the implementation stage.

This is achieved with the method of the type described in the preamble, the method being characterized in that a sampled signal is applied to an estimator, which processes the samples in such a way that an estimate is calculated from the samples for each desired signal by utilizing all samples which have arrived during a particular monitoring period, and that whenever a new sample arrives at the estimator, said previously calculated estimates are updated on the basis of the sample which arrived.

The invention also relates to a receiver comprising means for sampling a received signal and means for measuring the mutual delays of the transmissions contained in the signal and for measuring the strengths of the transmissions from the received signal, said transmissions originating in one or more transmitters. The receiver, according to the invention, is characterized in that the receiver comprises means for calculating an estimate from sampled signals for each desired transmission on the basis of all samples which arrived during a particular monitoring period, and whenever a new sample arrives at the input of the calculating means, the calculating means updates the calculated estimates on the basis of the new sample.

In the method according to the invention, samples taken from a signal are supplied to an optimal linear estimator (OLE), which is an unbiased estimator, providing a minimum variance, for the amplitudes of the signal samples of the users. The OLE provides a momentary, usually complex, amplitude estimate, which can be quantized to provide a symbol estimate, as well. The method, according to the invention, can be applied generally in all linear modulation methods, such as MPSK and M-QAM.

The method according to the invention utilizes an adjustable monitoring period extending over several transmitted data symbols and thus providing reliable estimates. The method according to the invention is order-recursive, wherefore the number of the users and the paths can easily be decreased and increased. The length of the monitoring period may be selected on the basis of the characteristics of the received signals, such as the cross-correlation properties of the waveforms of the users.

The preferred embodiment of the invention utilizes a multistage reception method wherein the preliminary estimates provided by the optimal linear estimator are supplied to a suitable post-processing block, where reliable detection is performed on the basis of the estimates with a suitable detection method, for example a Viterbi-type detector or some other linear or nonlinear detector.

BRIEF DESCRIPTION OF THE DRAWINGS

In the following, the invention will be described in greater detail with reference to the examples according to the accompanying drawings, in which.

DESCRIPTION OF THE PREFERRED EMBODIMENTS

Figures 1, 2, 3, 4:
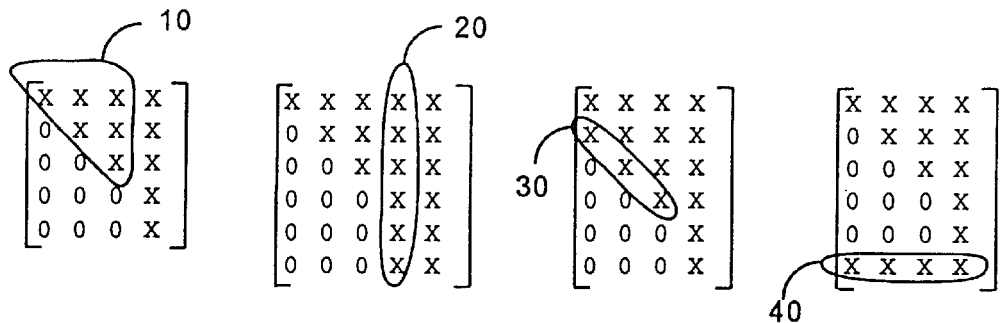
FIGS. 1 to 4 illustrate the matrix operations applied in the method according to the invention.

In the arrangement according to the invention, a signal which has been received and possibly processed in some way is sampled. The samples are not supplied to matched filters, as in a conventional receiver, but each sample is provided to an optimal linear estimator (OLE). The estimator examines the received sampled signal during a monitoring period extending over several data symbols, and the received symbols are estimated on the basis of this.

The reception method according to the invention can be applied both in a synchronous and an asynchronous system. The method is applicable regardless of the number of users or the number of the multipath-propagated signal components of each user.

The monitoring period may have the same duration as for example the channel coherence time. The monitoring period is continuously updated as new samples arrive at the estimator. In the method according to the invention, when a new sample arrives at the estimator the estimate of the desired signal is not recalculated completely on the basis of the available samples, but in order to reduce the number of calculations, a correction term is calculated on the basis of the new sample, and it is used to update the estimate calculated on the basis of the previous samples. In the method according to the invention, the updating may be performed sequentially by utilizing a so-called SLS (Sequential Least Squares) calculation method. The method is described in greater detail in [1] R. W. Farebrother, *Linear Least-Squares Computations,* Marcel Dekker, New York, 1988, and in [2] S. M. Kay, *Fundamentals of Statistical Signal Processing: Estimation Theory,* Prentice-Hall, N.J., 1993. However, the method will be described shortly below.

A received asynchronous CDMA signal r(t) is generally of the form $$r(t) = \sum_{k=1}^{K(t)} \sum_{m=-1}^{M(k)} \sum_{l=1}^{L(t,k)} \alpha_{klm} b_{km} s_k(t - mT - d_{klm}) + w(t)$$

where $\alpha_{klm}$ is a complex channel attenuation, $b_{km}$ is the symbol of the user, $s_k(t-nT-d_{klm})$ is the broad-band waveform (spreading code sequence) of the user, $d_{klm}$ is a delay resulting from asynchronism, and w(t) is noise. The number of the users K(t) is a function varying with time, M(k) is the number of the symbols to be transmitted, and L(t,k) is the number of the received signal components which depends on the time and the user. L(t,k) varies as a function of time, since the number of the multipath-propagated signal components for different users varies with time. The same equation may also be represented in vector form $$R = Hu + w;$$

where the components of u comprise the channel attenuation $\alpha_{klm}$ and the input terms of the symbols $b_{km}$ of the user, w comprises a noise vector, and H waveforms of the users $H=[h_1, h_2, \ldots h_K]$. The desired quantity u can be resolved from this equation directly with the formula $$u = (H^T H)^{-1} H^{-T} S,$$

where S represents the spreading code sequences $s_k$ in matrix form, but the operation is demanding with respect to calculation due to the matrix inversion operations.

In the method according to the invention, when a new sample arrives at the estimator, the estimate is not completely recalculated, since it would require massive matrix calculations, but the previous estimate $\hat{u}[n-1]$ is updated on the basis of the information contained in the new sample with the correction term to be calculated:

$$\hat{u}[n] = \hat{u}[n-1] + G[n](r[n] - h^T \hat{u}[n-1]),$$

where G[n] is a weighting coefficient which depends on the number of the samples, and the term in the brackets describes a possible mistake caused in the old estimate by the information contained in the new sample. $h^T$ is the new horizontal line in H, corresponding to the new sample. The above formula is described in greater detail in the aforementioned reference [2].

In a cellular radio system, the signal components of the received signal constantly vary in such a way that the number of the users also changes constantly when a call begins or ends, and also when the number of the multipath-propagated signal components changes. The signal components also change when a symbol transmitted by a user is altered to a new symbol. The number of the received signal components is thus dependent on the aforementioned terms K, L and M, which vary as a function of time. For this reason, when the aforementioned matrix formula providing the solution for u is used, massive matrix inversion operations must constantly be performed.

The reception method according to the invention utilizes a recursive calculation method ORLS (Order Recursive Least Squares) by means of which the aforementioned matrix inversion operations can be avoided and signal components can be added or deleted without massive calculations. The estimate matrix $\hat{u}_K$ calculated according to the invention is updated recursively when the number of the signal components changes depending on K, L and M in such a way that the new number of components is used to calculate a correction term by means of which a new matrix $\hat{u}_{K'}$ is provided on the basis of the previous estimate matrix. Therefore there is no need to recalculate the entire matrix $\hat{u}$.

Assume that with a particular number of signal components the equation to be solved is of the aforementioned form R=Hu+w. Assume in this example that the number of components is increased by one. Correspondingly, the dimensions of the calculation matrices, as well as w, are then changed, thus resulting in the equation $$R = [H h_{n+1}] \begin{bmatrix} u \\ u_{n+1} \end{bmatrix} + w.$$

The desired new $\hat{u}'$ can be calculated according to the method on the basis of the preceding $\hat{u}$ by means of a correction coefficient illustrated with the formula $$\hat{u}' = \begin{bmatrix} \hat{u} - G_1 \\ G_2 \end{bmatrix},$$

where the coefficients $G_1$ and $G_2$ are calculated on the basis of the coefficients of the new column $h_{n+1}$ to be added to the matrix H and the previous terms of the matrix H. The method is described in greater detail in the aforementioned reference [2].

The above-described operations can be performed without the matrix inversion operations with simple transformations. One way of performing the required transformations in order to realize the aforementioned recursive methods is described below. The calculation methods to be disclosed are described more thoroughly in the aforementioned reference [1]. It must be noted that there are also other known matrix calculation methods by means of which the corresponding operations may be performed, and the method according to the invention is not restricted to the operations set forth here by way of example.

The equation to be examined is in matrix form $$R = Hu + w.$$

In order to make the calculations easier, the matrices of the equation are used to form a new matrix having the form [H|R], i.e. vector R is added as the rightmost column of the matrix H. The aim is to change this new matrix into the form of FIG. 1, where the matrix comprises on the left side a triangular matrix 10, and the other terms are zero, except for the rightmost column which may be other than zero. In the figure, all terms which may have a value other than zero are denoted with letter X. This desired form is achieved by using for example the so-called Householder operation by means of which the matrix can be changed in such a way that each term below the desired term in the column is zero, and the Givens rotation by means of which any term in the matrix can be made zero. The values of the other terms in the matrices naturally change during these operations. The solution of the aforementioned equation does not change, however, since the above-described operations are unitary, as described in the reference mentioned above.

The equation formed by the matrix can be easily solved from the aforementioned form, if desired, by starting from the lower corner of the triangular matrix and going up line by line. This method is called a relocation method in the literature.

For example, by means of the aforementioned operations it is possible to change the equation in order to alter the monitoring period, or when the number of the signal components changes without a need to perform matrix inversion operations that are demanding with respect to calculation.

A few exemplary cases are examined below in order to illustrate the method according to the invention. Other similar matrix processing examples are disclosed in the aforementioned reference [1]. Assume that a new signal component is detected in the received signal. A column 20 corresponding to the new signal component is then added to the matrix of FIG. 1 to the right side of the triangular matrix, whereupon the matrix is of the type shown in FIG. 2. The matrix must then be changed back to the desired form of FIG. 1, comprising a triangular matrix and one column. This is done by resetting the two lowest terms of the added column by means of, for example, the Givens rotation. In the Givens rotation a matrix is multiplied by a certain calculable unitary matrix, whereupon the desired term can be reset. Correspondingly, if a signal component is to be deleted from the monitoring period, it is done by removing the leftmost column from the matrix. A matrix of the type shown in FIG. 2 then becomes the matrix of FIG. 3. In order that the desired form could be provided again, the diagonal 30 must be reset by utilizing either the Householder or Givens operation.

Furthermore, if the monitoring period is updated with a new sample in the case of FIG. 1, a new line 40 corresponding to the new sample is added to the matrix, according to FIG. 4. In order to provide again the desired form which comprises the triangular matrix and from which the equation is easy to solve, if desired, the bottom line must be reset by utilizing for example the Givens matrix operation.

The above-described operations can naturally be performed also when the samples and the signal components are not processed one by one but in groups, for example five samples or signal components at a time. The required calculations are in any case relatively simple.

By means of the OLE, the estimates obtained are supplied to the next stage of the receiver, comprising a suitable detection algorithm (EDA, enhanced detection algorithm) where reliable estimates are obtained from the received symbols by post-processing the estimates. Linear or nonlinear signal-processing methods may be used as post-processing.

The second stage of the receiver may be a sequential Viterbi-type detector employing successive channel estimation results.

The second-stage detector may also be based on processing block by block, whereupon the users are divided into groups on the basis of a suitable criterion, and simultaneous detection is performed on the signals in each group. The groups may be detected either in parallel or in succession by utilizing interference cancellation methods. This kind of method is described in greater detail in Finnish Patent Application 943196 which is referred to here.

The method according to the invention is applicable in an AWGN channel, a multipath channel, and a fading multipath channel, as well as in synchronous and asynchronous data transmission systems. The only precondition for the method is that the mutual delays of the signal components can be estimated before the first detection stage (OLE) of the receiver. The delays can be estimated with known methods, such as a matched filter, but the method according to the invention may also apply an iterative calculation method, which determines more accurately the obtained delay estimates in stages over several iteration rounds in order to achieve the desired degree of accuracy.

In an iterative method, a received signal is filtered first with a matched filter supplying an estimate for the strongest signal component of each user, and during the first round of iteration this strongest estimated signal component of each user is extracted from the received signal. The second strongest detected signal component of each user is then estimated and extracted from the remaining signal, and the procedure is continued in this way by always estimating and extracting the next strongest signal component from the signal, until all components have been estimated.

In the second iteration round, signals interfering the most with the strongest signal component of each user are extracted from the received signal, and the strongest signal component is then estimated again and extracted from the signal. The second strongest signal component is then estimated and extracted. A corresponding operation of extraction and estimation is performed on the other signal components in the order of magnitude. The delays can be estimated accurately with this method, but the operation is still not demanding with respect to calculation. The disclosed channel estimation method is described in greater detail in the co-pending Finnish Patent Application 944203 which is referred to here.

Figure 5:
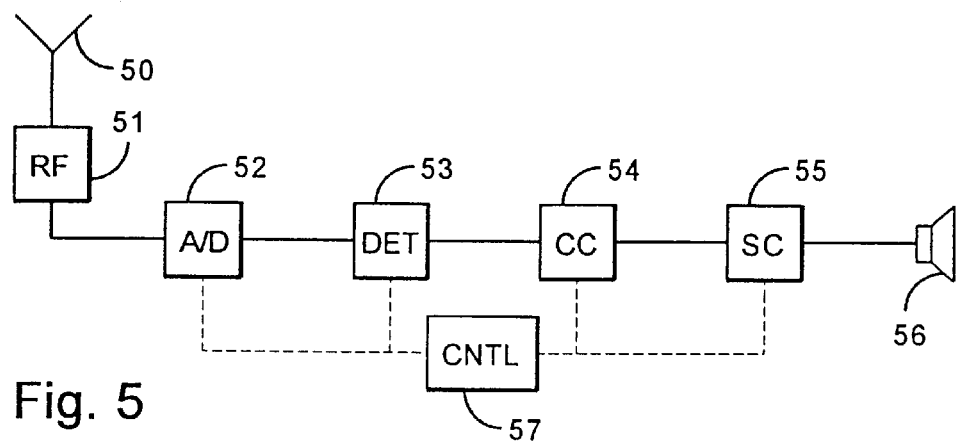
FIG. 5 is a block diagram illustrating the structure of a receiver according to the invention.

FIG. 5 is a block diagram illustrating the structure of a receiver according to the invention. The figure shows the receiver of a subscriber terminal, but the receiver according to the invention may naturally also be situated in a base station, and its essential parts, i.e. especially the detector blocks, are realized in the same way as in the terminal equipment. The receiver according to the invention comprises an antenna 50 receiving a signal which is supplied to radio-frequency parts 51, where the signal is converted to an intermediate frequency. From the radio-frequency parts the signal is supplied to an A/D converter 52, where the signal is converted to a digital form. The converted signal is supplied to a detector block 53, where the desired symbols contained in the signal are detected. In the receiver of the terminal equipment shown in FIG. 5 the detected signal is supplied to a channel decoder 54 and a speech decoder 55, from where the decoded speech signal is supplied to a loudspeaker 56. If the receiver is situated in the base station, the signal is supplied after the detector block to other parts of the receiver. The receiver according to the invention further comprises control means 57, which control the operations of the other parts.

Figure 6:
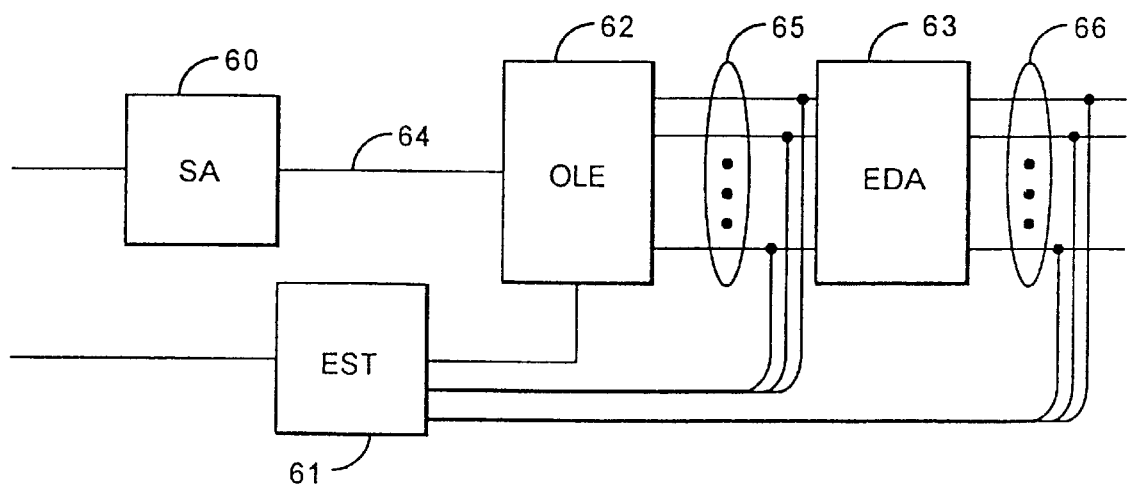
FIG. 6 is a block diagram illustrating in greater detail the structure of a detector block of a receiver according to the invention.

FIG. 6 is a block diagram illustrating in greater detail the realization of a detector in a receiver according to the invention. The receiver comprises means 60 which sample the received signal. The receiver also comprises estimation means 61, where the delays of the signal components contained in the received signal are estimated. The sampled signal and the data of the signal components and their delays are supplied to a first detector means 62 where the transmitted symbols are estimated by utilizing the methods described above in such a way that the estimates are calculated recursively by updating them whenever a new sample arrives, utilizing the above-described matrix calculation methods, which may be realized by employing one or several signal processors. The estimation means 61 may also utilize a decision feedback from the following detection stages of the receiver. The estimation means are then supplied with symbol estimates and complex attenuation coefficients 65, 66 which are obtained from the detectors and which may be utilized in the estimator 61 in calculating the delays.

In its preferred embodiment the receiver further comprises second detector means 63 the input of which is the output signal 65 of the first detector means 62 and in which a more accurate detection is calculated for the estimates computed by the first detector means 62. The second detector stage may comprise a Viterbi-type detector, a linear or nonlinear signal-processing block, or it may comprise a block-by-block detector.

Figure 7A:
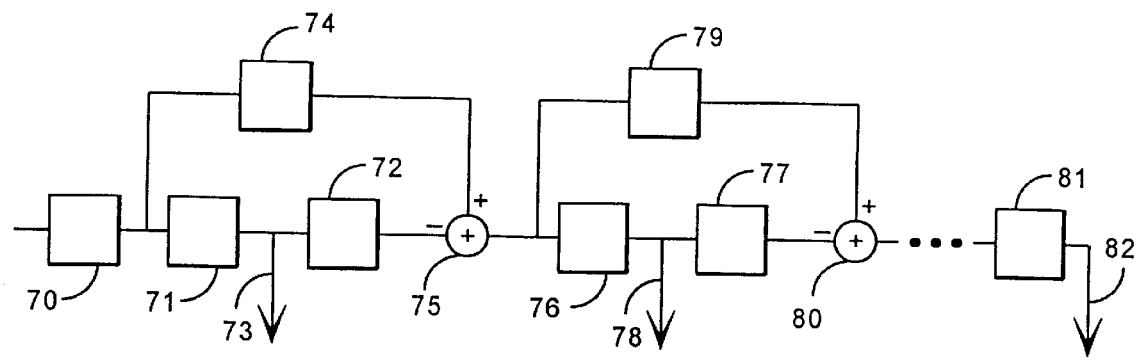
FIGS. 7a and 7b are block diagrams illustrating alternative implementations of the second detector stage of the receiver.
Figure 7B:
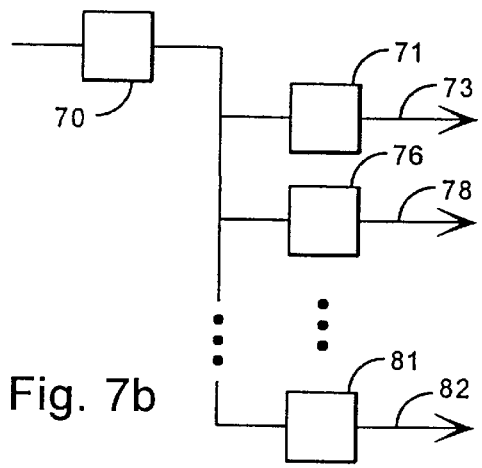

FIG. 7a illustrates a possible structure of the second detector block. The detector block comprises means 70 where the signal is divided into several groups, each of which comprises the signals of at least two users, and means 71, 76, 81 for detecting each group in succession, and means 72, 77 for regenerating, and means 75, 80 for extracting the signals of the groups already detected from the signal to be processed before the detection of the next block. The detector block also comprises delay means 74, 79, where the signal to be processed is stored during the detection and regeneration. FIG. 7b illustrates an alternative realization of the second detector block, the receiver therein comprising means 71, 76, 81 for detecting each group in parallel. The above-described structure of the second detector block is examined in greater detail in the aforementioned Finnish Patent Application 943196.

Figure 8:
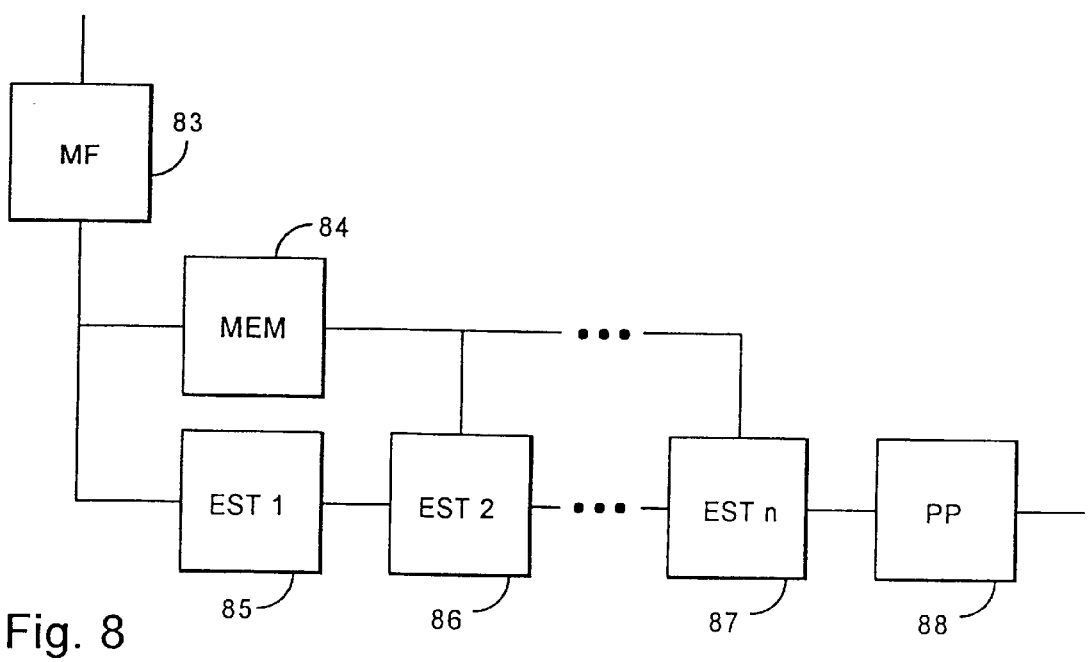
FIG. 8 illustrates a possible structure of a channel estimation block.

The estimation means 61, where the delays of the signal components contained in the received signal are estimated, may be implemented with known technology by means of a matched filter, but a better result is obtained with means applying an iterative method. FIG. 8 illustrates a possible structure of the means. The estimation means comprise means 83 for filtering the received signal with a filter matched with the channel, for estimating the delays and amplitudes of the strongest received signal components from the filtered signal. The estimator also comprises means 85 where the strongest estimated signal component of each user is extracted from the received signal, and the second strongest detected signal component of each user is estimated from the remaining signal. The estimator comprises means 85 for estimating and extracting always the next strongest signal component from the signal, until all components have been estimated.

In order to realize the second round of iteration, the estimator comprises means 86 for extracting from the received signal the signals interfering the most with the strongest signal component of each user, and means 86 for estimating and extracting again the strongest signal component, and means 86 for estimating and extracting the other signal components in the order of magnitude, and the receiver comprises means 87 for performing a required number of iteration rounds on the received signal and means 88 for performing signal postprocessing (PP). The estimator also comprises memory means 84 storing the received signal during the iteration rounds. The described channel estimation means 61 are examined in greater detail in the co-pending Finnish Patent Application 944203 referred to here.

Even though the invention is described above with reference to the example according to the accompanying drawings, it is clear that the invention is not related thereto, but it may be modified in many ways within the scope of the inventive idea disclosed in the appended claims.

We claim:

1. A method of receiving signals in a CDMA system, comprising:

sampling a received CDMA signal, including a plurality of signal components, and measuring mutual delays of transmissions from the received CDMA signal, the transmissions originating from at least one transmitter;

applying a sampled CDMA signal to an estimator which processes sampled CDMA signals such that a corresponding estimate is calculated, from the sampled CDMA signals, for each one of at least one desired signal component by utilizing all sampled CDMA signals which arrived during a particular monitoring period; and updating the corresponding estimate for each one of the at least one desired signal component, whenever a new sampled CDMA signal arrives at the estimator, based on changes in the new sampled CDMA signal.

2. A method according to claim 1, wherein the updating is performed by utilizing known matrix operations.

3. A method according to claim 1, wherein a length of a monitoring period depends on properties of the received signal components.

4. A method according to claim 3, wherein the estimate is updated whenever a number of the received signal components is to be changed.

5. A method according to claim 1, wherein the updating is performed whenever a number of the received signal components is to be changed.

6. A method according to claim 1, wherein the applying further comprises applying at least two successive ones of the sampled CDMA signals at a time to the estimator as input before performing the updating.

7. A method according to claim 1, wherein the obtained corresponding estimate for each one of the at last one desired signal component is subjected to post-processing where reliable channel and symbol estimates are calculated from the corresponding estimate.

8. A method according to claim 7, wherein the post-processing includes shaping the corresponding estimate with linear or nonlinear filtration methods.

9. A method according to claim 7, wherein during the post-processing signals of different users are divided into groups, each of the groups comprises signals of at least two users, and the signals of a group are detected simultaneously.

10. A method according to claim 9, wherein during the post-processing each of the groups is detected in succession, and detected signals of the groups are regenerated and deleted from a received transmission before detection of a next group.

11. A method according to claim 9, wherein during the post-processing each of the groups is detected in parallel.

12. A method according to claim 1, wherein the updating step is performed without again performing the applying step.

13. A receiver according to claim 1, wherein the corresponding estimate for each one of the at least one desired signal component comprises channel attenuation estimates and a user symbol estimate.

14. A method according to claim 13, wherein the updating is performed by utilizing known matrix operations.

15. A method according to claim 13, wherein a length of a monitoring period depends on properties of the received signal components.

16. A method according to claim 15, wherein the estimate is updated whenever a number of the received signal components is to be changed.

17. A method according to claim 13, wherein the updating is performed whenever a number of the received signal components is to be changed.

18. A method according to claim 13, wherein the applying further comprises applying at least two successive ones of the sampled CDMA signals at a time to the estimator as input before performing the updating.

19. A method according to claim 12, wherein the post-processing includes shaping the corresponding estimate with linear or nonlinear filtration methods.

20. A method according to claim 12, wherein during the post-processing signals of different users are divided into groups, each of the groups comprises signals of at least two users, and the signals of a group are detected simultaneously.

21. A method according to claim 20, wherein during the post-processing each of the groups is detected in succession, and detected signals of the groups are regenerated and deleted from a received transmission before detection of a next group.

22. A method according to claim 20, wherein during the post-processing each of the groups is detected in parallel.

23. A method according to claim 13, wherein the obtained corresponding estimate for each one of the at last one desired signal component is subjected to post-processing where reliable channel and symbol estimates are calculated from the corresponding estimate.

24. A receiver comprising:

means for sampling a received CDMA signal;

means for measuring mutual delays of transmissions included in the received CDMA signal and strengths of the transmissions, the transmissions originating in at least one transmitter; and means for calculating a corresponding estimate, from a plurality of samples of the received CDMA signal, for each one of at least one desired transmission based on all samples which arrive during a particular monitoring period, wherein whenever a new sample arrives at the receiver, the means for calculating updates the corresponding estimate for each one of the at least one desired transmission, based on changes in the new sample, without recalculating the corresponding estimate for each one of the at least one desired transmission.

25. A receiver according to claim 24, wherein the receiver comprises means for selecting a length of a monitoring period based on properties of the received CDMA signal.

26. A receiver according to claim 24, wherein the calculation means collects at least two samples from a sample line arriving as input before calculating a correction term for the corresponding estimate based on the samples.

27. A receiver according to claim 24, further comprising:

post-processing means, connected to an output of the calculating means, for calculating reliable channel and symbol estimates based on input preliminary estimates.

28. A receiver according to claim 27, wherein the post-processing means comprises:

means for dividing the output from the calculating means into several groups, each of the groups comprises signals of at least two users; and means for performing simultaneous detection on the signals in each of the several groups.

29. A receiver according to claim 28, further comprising means for detecting each of the several groups in parallel.

30. A receiver according to claim 28, further comprising:

means for detecting each of the several groups in succession;

means for regenerating the signals of the several groups already detected from the received CDMA signal before detection of a next group; and means for extracting the signals of the several groups already detected from the received CDMA signal before detection of the next group.

31. A receiver according to claim 24, wherein the corresponding estimate for each one of the at least one desired transmission comprises channel attenuation estimates and a user symbol estimate.

32. A receiver according to claim 31, wherein the receiver comprises means for selecting a length of a monitoring period based on properties of the received CDMA signal.

33. A receiver according to claim 31, further comprising:

post-processing means, connected to an output of the calculating means, for calculating reliable channel and symbol estimates based on input preliminary estimates.

34. A receiver according to claim 33, wherein the post-processing means comprises:

means for dividing the output from the calculating means into several groups, each of the groups comprises signals of at least two users; and means for performing simultaneous detection on the signals in each of the several groups.

35. A receiver according to claim 34, further comprising:

means for detecting each of the several groups in succession;

means for regenerating the signals of the several groups already detected from the received CDMA signal before detection of a next group; and means for extracting the signals of the several groups already detected from the received CDMA signal before detection of the next group.

36. A receiver according to claim 34, further comprising means for detecting each of the several groups in parallel.

37. A receiver according to claim 31, wherein the calculation means collects at least two samples from a sample line arriving as input before calculating a correction term for the corresponding estimate based on the samples.

* * * * *